(12) United States Patent
Wu et al.

(10) Patent No.: US 12,022,533 B2
(45) Date of Patent: Jun. 25, 2024

(54) METHOD AND APPARATUS FOR TRANSMITTING PHYSICAL RANDOM ACCESS CHANNEL SIGNAL, AND ELECTRONIC DEVICE

(71) Applicant: VIVO MOBILE COMMUNICATION CO., LTD., Chang'an Dongguan (CN)

(72) Inventors: Kai Wu, Chang'an Dongguan (CN); Xiaodong Shen, Chang'an Dongguan (CN); Siqi Liu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 347 days.

(21) Appl. No.: 17/479,686

(22) Filed: Sep. 20, 2021

(65) Prior Publication Data

US 2022/0030639 A1   Jan. 27, 2022

Related U.S. Application Data

(63) Continuation of application No. PCT/CN2020/080210, filed on Mar. 19, 2020.

(30) Foreign Application Priority Data

Mar. 22, 2019   (CN) .......................... 201910223878.4

(51) Int. Cl.
*H04W 74/0833* (2024.01)
*H04W 72/0446* (2023.01)
*H04W 74/00* (2009.01)

(52) U.S. Cl.
CPC ... *H04W 74/0841* (2013.01); *H04W 72/0446* (2013.01); *H04W 74/002* (2013.01)

(58) Field of Classification Search
CPC ........... H04W 74/0841; H04W 74/002; H04W 72/0446
USPC .......................................................... 370/329
See application file for complete search history.

(56) References Cited

U.S. PATENT DOCUMENTS

| | | | |
|---|---|---|---|
| 11,382,142 B2* | 7/2022 | Dong | .................. H04W 74/085 |
| 2012/0236810 A1 | 9/2012 | Park et al. | |
| 2016/0309467 A1 | 10/2016 | Yerramalli et al. | |
| 2018/0160448 A1 | 6/2018 | Blankenship et al. | |
| 2018/0279136 A1 | 9/2018 | Tsai et al. | |

(Continued)

FOREIGN PATENT DOCUMENTS

| | | |
|---|---|---|
| CN | 104247303 A | 12/2014 |
| CN | 106453182 A | 2/2017 |

(Continued)

OTHER PUBLICATIONS

Chinese Office Action related to Application No. 201910223878.4 reported on Jul. 2, 2021.

(Continued)

*Primary Examiner* — Mong-Thuy T Tran
(74) *Attorney, Agent, or Firm* — von Briesen & Roper, s.c.

(57) ABSTRACT

This application provides a method and an apparatus for transmitting a physical random access channel signal, and an electronic device. The method includes: indicating information about a valid time period to user equipment (UE), where the valid time period is a part of a time domain resource of a physical random access channel (PRACH); and receiving a PRACH signal transmitted by the UE.

18 Claims, 9 Drawing Sheets

(56) References Cited

U.S. PATENT DOCUMENTS

| | | | |
|---|---|---|---|
| 2018/0332626 A1* | 11/2018 | You | H04W 72/23 |
| 2019/0124687 A1 | 4/2019 | Yang et al. | |
| 2019/0159255 A1* | 5/2019 | Zheng | H04W 48/16 |
| 2020/0162952 A1 | 5/2020 | Yu et al. | |
| 2020/0178312 A1 | 6/2020 | Jiang et al. | |
| 2020/0186308 A1 | 6/2020 | Yan et al. | |
| 2020/0214046 A1 | 7/2020 | Wang et al. | |
| 2020/0221506 A1* | 7/2020 | Jeon | H04W 74/0833 |
| 2020/0260480 A1 | 8/2020 | Wu et al. | |
| 2020/0275483 A1* | 8/2020 | Li | H04L 5/0078 |
| 2021/0022186 A1* | 1/2021 | Liu | H04W 72/0446 |
| 2021/0168859 A1* | 6/2021 | Yang | H04W 76/11 |
| 2021/0307066 A1* | 9/2021 | Shi | H04W 16/14 |
| 2022/0150982 A1* | 5/2022 | Lee | H04W 74/0866 |
| 2023/0143073 A1* | 5/2023 | Li | H04W 74/0866 370/329 |
| 2023/0156639 A1* | 5/2023 | Wang | H04W 74/0808 370/350 |

FOREIGN PATENT DOCUMENTS

| | | |
|---|---|---|
| CN | 107041014 A | 8/2017 |
| CN | 107926034 A | 4/2018 |
| CN | 108476480 A | 8/2018 |
| CN | 108631971 A | 10/2018 |
| CN | 109302726 A | 2/2019 |
| CN | 109392156 A | 2/2019 |
| CN | 109413756 A | 3/2019 |
| CN | 109451585 A | 3/2019 |
| CN | 109474995 A | 3/2019 |
| EP | 2472735 A2 | 4/2012 |
| EP | 3439413 A1 | 11/2016 |
| WO | 2014161194 A1 | 10/2014 |

OTHER PUBLICATIONS

International Search Report and Written Opinion related to Application No. PCT/CN2020/080210 reported on Oct. 7, 2021.

R1-1812978—Source: Samsung "Initial Access and Mobility Procedure for NR-U", Agenda item: 7.2.2.4.2, Document for: Discussion and Decision, 3GPP TSG RAN WG1 Meeting #95, Spokane, USA, Nov. 12-16, 2018.

Extended European Search Report related to Application No. 20777464.7 reported on Apr. 19, 2022.

R1-1812404—Source: Fujitsu "On UL signals and channels design for NR-U", Agenda item: 7.2.2.3.2, Document for: Discussion and Decision, 3GPP TSG RAN WG1 Meeting #95, Spokane, USA, Nov. 12-16, 2018.

R1-1902258—Source: Samsung "Enhancements to Initial Access Procedure for NR-U", Agenda item: 7.2.2.2.2, Document for: Discussion and Decision, 3GPP TSG RAN WG1 Meeting #96, Athens, Greece, Feb. 25- Mar. 1, 2019.

First Japanese Office Action related to Application No. 2021-556945 reported on Sep. 27, 2022.

R1-1900607—Source: LG Electronics "Initial access and mobility for NR-U", Agenda item: 7.2.2.2.2, Document for: Discussion and Decision, 3GPP TSG RAN WG1 Ad-Hoc Meeting 1901, Taipei, Taiwan, Jan. 21-25, 2019.

R1-1904062—Source: vivo "Discussion on initial access signals and channels", Agenda item: 7.2.2.1.1, Document for: Discussion and Decision, 3GPP TSG RAN WG1 #96 bis, Xi'an, China, Apr. 8-12, 2019.

* cited by examiner

METHOD AND APPARATUS FOR TRANSMITTING PHYSICAL RANDOM ACCESS CHANNEL SIGNAL, AND ELECTRONIC DEVICE

CROSS-REFERENCE TO RELATED APPLICATIONS

This disclosure is a continuation application of PCT International Application No. PCT/CN2020/080210 filed on Mar. 19, 2020, which claims priority to Chinese Patent Application No. 201910223878.4, filed on Mar. 22, 2019 in China. The disclosures of these applications are incorporated herein by reference in their entireties.

TECHNICAL FIELD

This disclosure relates to the field of communications technologies, and in particular, to a method and an apparatus for transmitting a physical random access channel signal, and an electronic device.

BACKGROUND

On an unlicensed band of new radio (NR), before transmitting information, a terminal or a network device needs to perform clear channel assessment (CCA) and/or extended clear channel assessment (eCCA) to listen to a channel, that is, performs energy detection (ED). When energy is lower than a preset threshold, the channel is determined to be idle, and then transmission can be started. This is LBT (listen before talk). A process for transmission through the above procedure is referred to as a channel access procedure.

Based on this, if user equipment (UE) #1 expects to perform uplink transmission on a random access occasion (RO) #1 of a physical random access channel (PRACH), the user equipment needs to perform a CCA operation on a time domain resource before the RO #1. However, the time domain resource before the RO #1 may be used for PRACH transmission of another UE #0. That is, during the CCA, the UE #1 may detect energy of a PRACH signal transmitted by the UE #0, and the UE #1 may determine the channel to be busy because the energy of the signal is higher than a preset threshold. Consequently, the UE #1 fails to transmit a PRACH signal.

The information disclosed in the background section is merely intended for a better understanding of the overall background of this disclosure, and the information should be neither expressly or impliedly admitted as the related art already known to persons of ordinary skill in the art.

SUMMARY

According to a first aspect, an embodiment of this disclosure provides a method for transmitting a physical random access channel signal, applied to a network device, including: indicating information about a valid time period to user equipment (UE), where the valid time period is a part of a time domain resource of a physical random access channel (PRACH); and receiving a PRACH signal transmitted by the UE.

According to a second aspect, an embodiment of this disclosure provides a method for transmitting a physical random access channel signal, applied to user equipment, including: obtaining information about a valid time period, where the valid time period is a part of a time domain resource of a physical random access channel (PRACH); and transmitting the PRACH signal within the valid time period.

According to a third aspect, an embodiment of this disclosure provides an apparatus for transmitting a physical random access channel signal, including: an indication module, configured to indicate information about a valid time period to user equipment (UE), where the valid time period is a part of a time domain resource of a physical random access channel (PRACH); and a receiving module, configured to receive a PRACH signal transmitted by the UE.

According to a fourth aspect, an embodiment of this disclosure provides an apparatus for transmitting a physical random access channel signal, including: an obtaining module, configured to obtain information about a valid time period, where the valid time period is a part of a time domain resource of a physical random access channel (PRACH); and a transmitting module, configured to transmit the PRACH signal within the valid time period.

According to a fifth aspect, an embodiment of this disclosure provides an electronic device, including: a memory, a processor, and computer executable instructions stored on the memory and capable of running on the processor, where when the computer executable instructions are executed by the processor, the steps of the method as described in the first aspect are implemented.

According to a sixth aspect, an embodiment of this disclosure provides an electronic device, including: a memory, a processor, and computer executable instructions stored on the memory and capable of running on the processor, where when the computer executable instructions are executed by the processor, the steps of the method as described in the second aspect are implemented.

According to a seventh aspect, an embodiment of this disclosure provides a computer-readable storage medium, where the computer-readable storage medium is configured to store computer executable instructions, and when the computer executable instructions are executed by a processor, the steps of the method as described in the first aspect are implemented.

According to an eighth aspect, an embodiment of this disclosure provides a computer-readable storage medium, where the computer-readable storage medium is configured to store computer executable instructions, and when the computer executable instructions are executed by a processor, the steps of the method as described in the second aspect are implemented.

BRIEF DESCRIPTION OF DRAWINGS

In order to describe the technical solutions in the embodiments of this disclosure or in the related art more clearly, the accompanying drawings required for describing the embodiments or the related art are briefly described below. Apparently, the accompanying drawings in the following description show only some embodiments recorded in this disclosure, and persons of ordinary skill in the art may still derive other drawings from these accompanying drawings.

DETAILED DESCRIPTION OF EMBODIMENTS

To help persons in the art better understand the technical solutions in this disclosure, the technical solutions in the embodiments of this disclosure are clearly described below with reference to the accompanying drawings in the embodiments of this disclosure. Apparently, the described embodiments are only some rather than all of the embodiments of this disclosure. All other embodiments derived by persons of ordinary skill in the art based on the embodiments of this disclosure without creative efforts shall fall within the protection scope of this disclosure.

Figure 1:
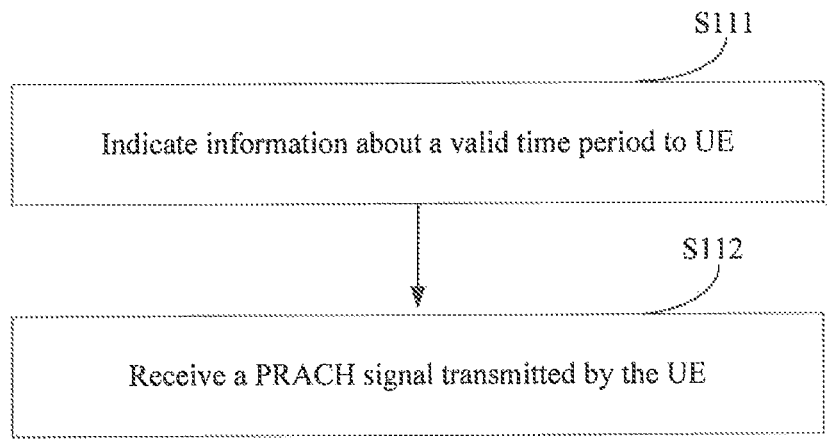
FIG. 1 is a schematic flowchart of a method for transmitting a physical random access channel signal according to an embodiment of this disclosure.

FIG. 1 is a schematic flowchart of a method for transmitting a physical random access channel signal according to an embodiment of this disclosure. The method may be performed by an electronic device, such as a network device. In other words, the method may be performed by software or hardware installed on the network device. As shown in the figure, the method may include the following steps S111 and S112.

S111: Indicate information about a valid time period to UE.

The valid time period is a part of a time domain resource of a PRACH.

The network device may determine a part of the time domain resource of the PRACH as a valid time period, and the other part different from the valid time period is an idle time period.

In a possible implementation, obtaining information about a valid time period by the UE includes receiving the information about the valid time period that is indicated by the network device.

S112: Receive a PRACH signal transmitted by the UE.

The UE transmits the PRACH signal within the valid time period. Specifically, the UE transmits the PRACH signal only within the valid time period. In other words, the UE does not transmit the PRACH signal within the idle time period.

The network device receives the PRACH signal transmitted by the UE within the valid time period.

Therefore, according to the method for transmitting a physical random access channel signal provided in this embodiment of this disclosure, the information about the valid time period is indicated to the UE, where the valid time period is a part of the time domain resource of the physical random access channel (PRACH); and the PRACH signal transmitted by the UE is received. A part of the time domain resource of the PRACH can be used to transmit the PRACH signal, and a part of the time domain resource of the PRACH is reserved as an idle time period, so that the UE can use the idle time period for CCA, to prevent a channel from being falsely determined to be busy, thereby ensuring a normal transmission of the PRACH signal.

Figure 2:
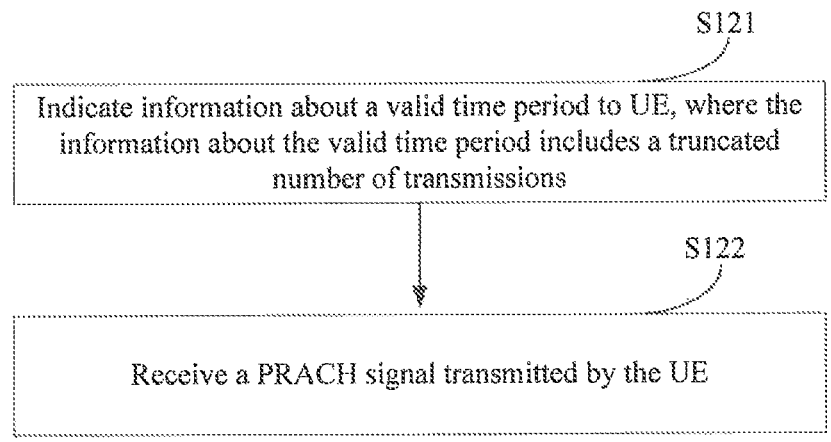
FIG. 2 is another schematic flowchart of a method for transmitting a physical random access channel signal according to an embodiment of this disclosure.

FIG. 2 is a schematic flowchart of a method for transmitting a physical random access channel signal according to an embodiment of this disclosure. The method may be performed by an electronic device, such as a network device. In other words, the method may be performed by software or hardware installed on the network device. As shown in the figure, the method may include the following steps S121 and S122.

S121: Indicate information about a valid time period to UE, where the information about the valid time period includes the truncated number of transmissions.

The truncated number of transmissions is the number of transmissions of a time domain sequence of a random access preamble within one RO, and the truncated number of transmissions is greater than or equal to 1.

Figure 3A:
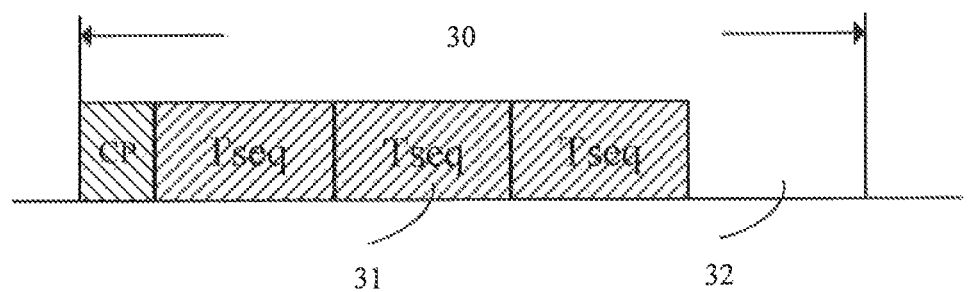
FIG. 3a is a schematic diagram of a method for transmitting a physical random access channel signal according to an embodiment of this disclosure.

FIG. 3a is a schematic diagram of a method for transmitting a physical random access channel signal according to an embodiment of this disclosure. As shown in the figure, a time domain resource of a PRACH includes at least one RO. A PRACH signal includes a cyclic prefix CP and a time domain sequence of a preamble. The truncated number of transmissions corresponds to a valid time period 31, and the valid time period 31 is less than transmission duration 30 of one RO. A time period other than the valid time period 31 within the transmission duration 30 of one RO is an idle time period 32.

In a possible implementation, obtaining information about a valid time period by the UE includes receiving the information about the valid time period that is indicated by the network device.

S122: Receive a PRACH signal transmitted by the UE.

The UE transmits the PRACH signal within the valid time period. Specifically, the UE transmits the PRACH signal only within the valid time period. In other words, the UE does not transmit a PRACH signal within the idle time period.

The network device receives the PRACH signal transmitted by the UE within the valid time period.

Therefore, according to the method for transmitting a physical random access channel signal provided in this embodiment of this disclosure, the information about the valid time period is indicated to the UE, where the valid time period is a part of the time domain resource of the physical random access channel (PRACH); and the PRACH signal transmitted by the UE is received. A part of the time domain resource of the PRACH can be used to transmit the PRACH signal, and a part of the time domain resource of the PRACH is reserved as an idle time period, so that the UE can use the idle time period for CCA, to prevent a channel from being falsely determined to be busy, thereby ensuring a normal transmission of the PRACH signal.

Moreover, in this embodiment of this disclosure, the truncated number of transmissions is the number of transmissions of a time domain sequence of a random access preamble within one random access occasion (RO), the truncated number of transmissions is greater than or equal to 1, and the valid time period is less than transmission duration of the one RO. By means of the truncated number of transmissions, a part of the transmission duration of one RO can be reserved as an idle time period, so that the UE can use the idle time period for CCA, to prevent a channel from being falsely determined to be busy, thereby ensuring a normal transmission of the PRACH signal.

Figure 4:
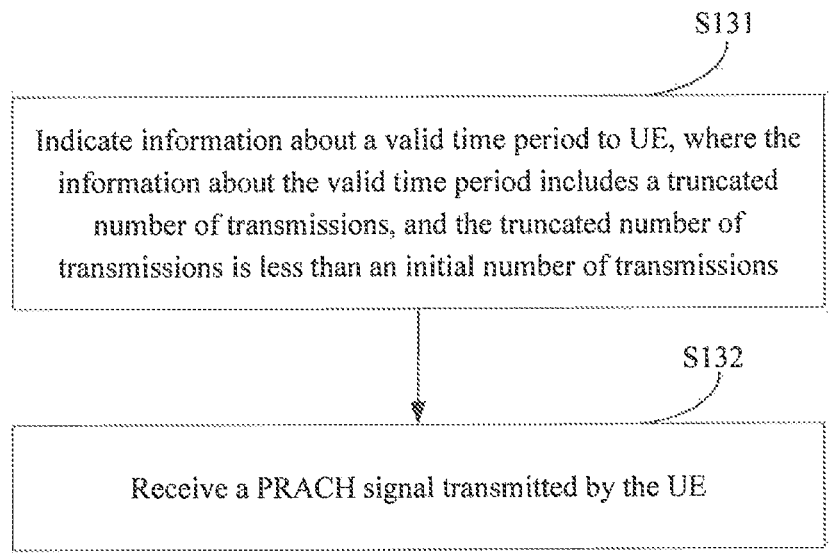
FIG. 4 is a schematic flowchart of a method for transmitting a physical random access channel signal according to an embodiment of this disclosure.

FIG. 4 is a schematic flowchart of a method for transmitting a physical random access channel signal according to an embodiment of this disclosure. The method may be performed by an electronic device, such as a network device. In other words, the method may be performed by software or hardware installed on the network device. As shown in the figure, the method may include the following steps S131 and S132.

S131: Indicate information about a valid time period to UE, where the information about the valid time period includes the truncated number of transmissions, and the truncated number of transmissions is less than an initial number of transmissions.

The truncated number of transmissions is the number of transmissions of a time domain sequence of a random access preamble within one RO, and the truncated number of transmissions is greater than or equal to 1.

In a possible implementation, the initial number of transmissions is the number of transmissions of the time domain sequence of the preamble corresponding to a specified PRACH format within the one RO, and the initial number of transmissions is greater than 1.

For example, Table 1 shows a possible specified PRACH format, where a coefficient multiplied by $2048\kappa \cdot 2^{-\mu}$ in the column $N_u$ is the initial number of transmissions.

TABLE 1

| Format | $L_{RA}$ | $\Delta f^{RA}$ | $N_u$ | $N_{CP}^{RA}$ | Support for restricted sets |
|---|---|---|---|---|---|
| A1 | 139 | $15 \cdot 2^\mu$ kHz | $2 \cdot 2048\kappa \cdot 2^{-\mu}$ | $288\kappa \cdot 2^{-\mu}$ | — |
| A2 | 139 | $15 \cdot 2^\mu$ kHz | $4 \cdot 2048\kappa \cdot 2^{-\mu}$ | $576\kappa \cdot 2^{-\mu}$ | — |
| A3 | 139 | $15 \cdot 2^\mu$ kHz | $6 \cdot 2048\kappa \cdot 2^{-\mu}$ | $864\kappa \cdot 2^{-\mu}$ | — |
| B1 | 139 | $15 \cdot 2^\mu$ kHz | $2 \cdot 2048\kappa \cdot 2^{-\mu}$ | $216\kappa \cdot 2^{-\mu}$ | — |
| B2 | 139 | $15 \cdot 2^\mu$ kHz | $4 \cdot 2048\kappa \cdot 2^{-\mu}$ | $360\kappa \cdot 2^{-\mu}$ | — |

TABLE 1-continued

| Format | $L_{RA}$ | $\Delta f^{RA}$ | $N_u$ | $N_{CP}^{RA}$ | Support for restricted sets |
|---|---|---|---|---|---|
| B3 | 139 | $15 \cdot 2^\mu$ kHz | $6 \cdot 2048\kappa \cdot 2^{-\mu}$ | $504\kappa \cdot 2^{-\mu}$ | — |
| B4 | 139 | $15 \cdot 2^\mu$ kHz | $12 \cdot 2048\kappa \cdot 2^{-\mu}$ | $936\kappa \cdot 2^{-\mu}$ | — |
| C0 | 139 | $15 \cdot 2^\mu$ kHz | $2048\kappa \cdot 2^{-\mu}$ | $1240\kappa \cdot 2^{-\mu}$ | — |
| C2 | 139 | $15 \cdot 2^\mu$ kHz | $4 \cdot 2048\kappa \cdot 2^{-\mu}$ | $2048\kappa \cdot 2^{-\mu}$ | — |

The truncated number of transmissions is less than an initial number of transmissions. In a possible implementation, a predetermined number of times may be subtracted from the initial number of transmissions, to obtain the truncated number of transmissions. For example, for format A2, the initial number of transmissions is 4, and the truncated number of transmissions is 3. It needs to be ensured that the truncated number of transmissions is greater than or equal to 1, so that the PRACH signal can be completely transmitted. For example, for PRACH format C0 in Table 1, because the initial number of transmissions is 1, if a truncation operation in this step is performed, the complete transmission of the PRACH signal cannot be ensured, and therefore the truncation cannot be performed. The information about the valid time period that is indicated to the UE in this step includes only the truncated number of transmissions, and does not include the initial number of transmissions.

Table 2 shows a possible implementation of the truncated number of transmissions proposed in this embodiment of this disclosure.

TABLE 2

| Format | $L_{RA}$ | $\Delta f^{RA}$ | $N_u$ | $N_{CP}^{RA}$ | Support for restricted sets |
|---|---|---|---|---|---|
| A1s | 139 | $15 \cdot 2^\mu$ kHz | $1 \cdot 2048\kappa \cdot 2^{-\mu}$ | $288\kappa \cdot 2^{-\mu}$ | — |
| A2s | 139 | $15 \cdot 2^\mu$ kHz | $3 \cdot 2048\kappa \cdot 2^{-\mu}$ | $576\kappa \cdot 2^{-\mu}$ | — |
| A3s | 139 | $15 \cdot 2^\mu$ kHz | $5 \cdot 2048\kappa \cdot 2^{-\mu}$ | $864\kappa \cdot 2^{-\mu}$ | — |
| B1s | 139 | $15 \cdot 2^\mu$ kHz | $1 \cdot 2048\kappa \cdot 2^{-\mu}$ | $216\kappa \cdot 2^{-\mu}$ | — |
| B2s | 139 | $15 \cdot 2^\mu$ kHz | $3 \cdot 2048\kappa \cdot 2^{-\mu}$ | $360\kappa \cdot 2^{-\mu}$ | — |
| B3s | 139 | $15 \cdot 2^\mu$ kHz | $5 \cdot 2048\kappa \cdot 2^{-\mu}$ | $504\kappa \cdot 2^{-\mu}$ | — |
| B4s | 139 | $15 \cdot 2^\mu$ kHz | $11 \cdot 2048\kappa \cdot 2^{-\mu}$ | $936\kappa \cdot 2^{-\mu}$ | — |
| C2s | 139 | $15 \cdot 2^\mu$ kHz | $3 \cdot 2048\kappa \cdot 2^{-\mu}$ | $2048\kappa \cdot 2^{-\mu}$ | — |

A coefficient multiplied by $2048\kappa \cdot 2^{-\mu}$ in the column $N_u$ is the truncated number of transmissions. The initial number of transmissions specified in Table 1 minus 1 is used as the truncated number of transmissions. In Table 2, the formats are denoted as formats A1s, A2s, A3s, B1s, B2s, B3s, B4s, and C2s, respectively.

In a possible implementation, the network device may transmit formats A1, A2, A3, B1, B2, B3, B4, and C2 in Table 1 and formats A1s, A2s, A3s, B1s, B2s, B3s, B4s, and C2s in Table 2 to the UE, and the UE chooses the initial number of transmissions or the truncated number of transmissions.

In another possible implementation, the truncated number of transmissions may be determined according to a preset truncation goal. For example, the preset truncation goal is to reduce a transmission time by 25 microseconds, so as to reserve a sufficient idle time period for LBT. In this case, a valid time period can be calculated by reducing the transmission time of one RO by 25 microseconds, and the number of repeated transmissions of the time domain sequence of the preamble that can be performed within the valid time period is calculated as the truncated number of transmissions. Similarly, the truncated number of transmissions should be greater than 1 to ensure that the time domain sequence of the preamble can be completely transmitted. In addition, the truncated number of transmissions may not necessarily be an integer number.

S132: Receive a PRACH signal transmitted by the UE.

The UE transmits the PRACH signal within the valid time period. Specifically, the UE transmits the PRACH signal only within the valid time period. In other words, the UE does not transmit a PRACH signal within the idle time period.

The network device receives the PRACH signal transmitted by the UE within the valid time period.

Therefore, according to the method for transmitting a physical random access channel signal provided in this embodiment of this disclosure, the information about the valid time period is indicated to the UE, where the valid time period is a part of the time domain resource of the physical random access channel (PRACH); and the PRACH signal transmitted by the UE is received. A part of the time domain resource of the PRACH can be used to transmit the PRACH signal, and a part of the time domain resource of the PRACH is reserved as an idle time period, so that the UE can use the idle time period for CCA, to prevent a channel from being falsely determined to be busy, thereby ensuring a normal transmission of the PRACH signal.

Moreover, in this embodiment of this disclosure, the truncated number of transmissions is the number of transmissions of a time domain sequence of a random access preamble within one random access occasion (RO), the truncated number of transmissions is greater than or equal to 1, and the valid time period is less than transmission duration of the one RO. By means of the truncated number of transmissions, on the premise that the complete transmission of the preamble is ensured, a part of the transmission duration of one RO can be reserved as an idle time period, so that the UE can use the idle time period for CCA, to prevent a channel from being falsely determined to be busy, thereby ensuring a normal transmission of the PRACH signal.

Moreover, in this embodiment of this disclosure, the truncated number of transmissions is less than an initial number of transmissions, where the initial number of transmissions is the number of transmissions of the time domain sequence of the preamble corresponding to a specified PRACH format within the one RO, and the initial number of transmissions is greater than 1. In this way, on the premise that the complete transmission of the preamble is ensured, a part of the transmission duration of one RO can be reserved as an idle time period, so that the UE can use the idle time period for CCA, to prevent a channel from being falsely determined to be busy, thereby ensuring a normal transmission of the PRACH signal.

Figure 5:
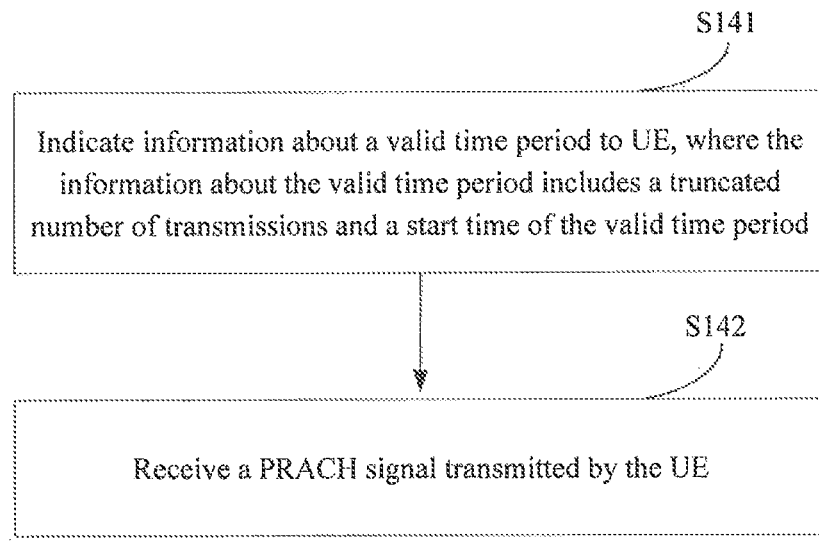
FIG. 5 is another schematic flowchart of a method for transmitting a physical random access channel signal according to an embodiment of this disclosure.

FIG. 5 is a schematic flowchart of a method for transmitting a physical random access channel signal according to an embodiment of this disclosure. The method may be performed by an electronic device, such as a network device. In other words, the method may be performed by software or hardware installed on the network device. As shown in the figure, the method may include the following steps S141 and S142.

S141: Indicate information about a valid time period to UE, where the information about the valid time period includes the truncated number of transmissions and a start time of the valid time period.

In a possible implementation, the information about the valid time period may be indicated to the UE by using higher layer signaling. The UE receives the information about the valid time period that is indicated by the network device.

The truncated number of transmissions is the number of transmissions of a time domain sequence of a random access preamble within one RO, and the truncated number of transmissions is greater than or equal to 1.

As shown in FIG. 3a, a time domain resource of a PRACH includes at least one RO. A PRACH signal includes a cyclic prefix CP and a time domain sequence of a preamble. The truncated number of transmissions corresponds to a valid time period 31, and the valid time period 31 is less than transmission duration 30 of one RO. A time period other than the valid time period 31 within the transmission duration 30 of one RO is an idle time period 32.

Figure 3B:
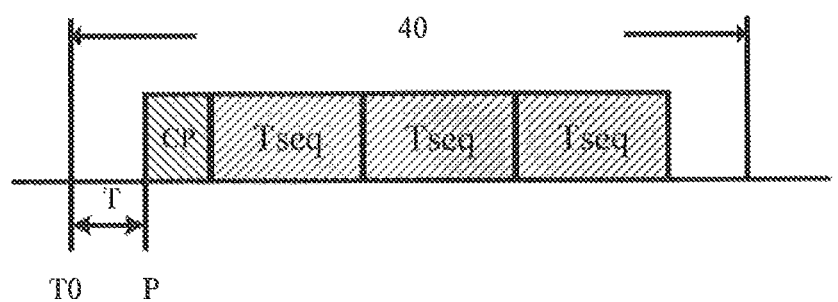
FIG. 3b is a schematic diagram of a method for transmitting a physical random access channel signal according to an embodiment of this disclosure.

FIG. 3b is a schematic diagram of a method for transmitting a physical random access channel signal according to an embodiment of this disclosure. As shown in the figure, the start time of the valid time period may be a delay time point P that is delayed by a preset time T relative to a start time T0 of the RO, and the UE may start transmitting a PRACH signal from the delay time point P, and transmit a preamble repeatedly and consecutively according to the truncated number of transmissions. Because the valid time period is shorter than transmission duration 40 of the RO, the number of repeated transmissions of the preamble can be reduced, and the delay time T is used such that an idle time period sufficient to complete LBT can be reserved within the transmission duration 40 of the RO.

Optionally, the preset time T is less than or equal to a difference between the transmission duration of the RO and the valid time period. In a possible implementation, the preset time may be 25 microseconds (μs).

S142: Receive a PRACH signal transmitted by the UE.

The UE transmits the PRACH signal within the valid time period. Specifically, the UE transmits the PRACH signal only within the valid time period. In other words, the UE does not transmit a PRACH signal within the idle time period. The network device receives the PRACH signal transmitted by the UE within the valid time period.

Therefore, according to the method for transmitting a physical random access channel signal provided in this embodiment of this disclosure, the information about the valid time period is indicated to the UE, where the valid time period is a part of the time domain resource of the physical random access channel (PRACH); and the PRACH signal transmitted by the UE is received. A part of the time domain resource of the PRACH can be used to transmit the PRACH signal, and a part of the time domain resource of the PRACH is reserved as an idle time period, so that the UE can use the idle time period for CCA, to prevent a channel from being falsely determined to be busy, thereby ensuring a normal transmission of the PRACH signal.

Moreover, in this embodiment of this disclosure, the truncated number of transmissions is the number of transmissions of a time domain sequence of a random access preamble within one random access occasion (RO), the truncated number of transmissions is greater than or equal to 1, and the valid time period is less than transmission duration of the one RO. By means of the truncated number of transmissions, a part of the transmission duration of one RO can be reserved as an idle time period, so that the UE can use the idle time period for CCA, to prevent a channel from being falsely determined to be busy, thereby ensuring a normal transmission of the PRACH signal.

Figure 6:
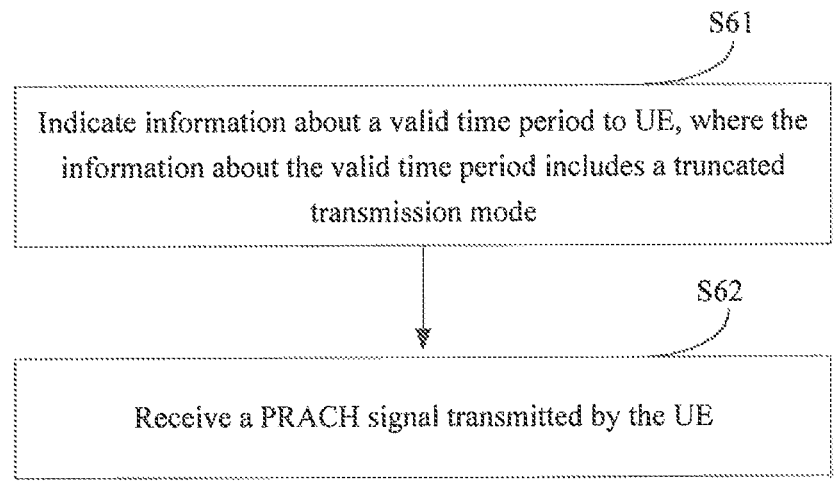
FIG. 6 is another schematic flowchart of a method for transmitting a physical random access channel signal according to an embodiment of this disclosure.

FIG. 6 is another schematic flowchart of a method for transmitting a physical random access channel signal according to an embodiment of this disclosure. The method may be performed by an electronic device, such as a network device. In other words, the method may be performed by software or hardware installed on the network device. As shown in the figure, the method may include the following steps S61 and S62.

S61: Indicate information about a valid time period to UE, where the information about the valid time period includes a truncated transmission mode.

The network device may indicate the UE to use the truncated transmission mode for transmission. The truncated transmission mode may be a predefined truncated transmission format, such as formats A1s, A2s, A3s, B1s, B2s, B3s, B4s, and C2s shown above in Table 2. In addition, the truncated transmission mode may alternatively be the predefined initial number of transmissions minus the predetermined number of times, for example, minus 1 or 2.

S62: Receive a PRACH signal transmitted by the UE.

The UE transmits the PRACH signal in the truncated transmission mode. The network device receives the PRACH signal transmitted by the UE.

Therefore, according to the method for transmitting a physical random access channel signal provided in this embodiment of this disclosure, the truncated transmission mode can be used to reserve a part of idle time period in the time domain resource of the PRACH, so that the UE can use the idle time period for CCA, to prevent a channel from being falsely determined to be busy, thereby ensuring a normal transmission of the PRACH signal.

Figure 7:
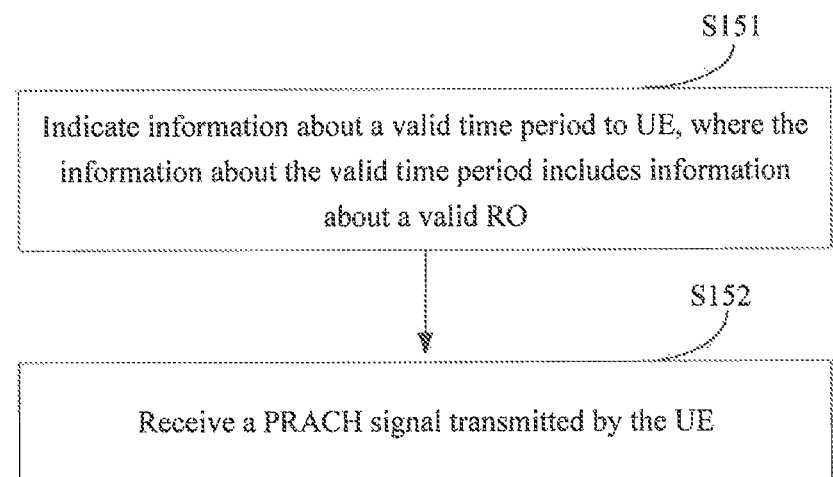
FIG. 7 is another schematic flowchart of a method for transmitting a physical random access channel signal according to an embodiment of this disclosure.

FIG. 7 is a schematic flowchart of a method for transmitting a physical random access channel signal according to an embodiment of this disclosure. The method may be performed by an electronic device, such as a network device. In other words, the method may be performed by software or hardware installed on the network device. As shown in the figure, the method may include the following steps S151 and S152.

S151: Indicate information about a valid time period to UE, where the information about the valid time period includes information about a valid RO.

In a possible implementation, obtaining information about a valid time period by the UE includes receiving the information about the valid time period that is indicated by the network device.

The valid time period is a part of a time domain resource of a PRACH. The time domain resource of the PRACH includes a plurality of ROs, and the valid RO is a part of the plurality of ROs. The other part of the ROs different from the valid RO is an idle RO.

Figure 8:
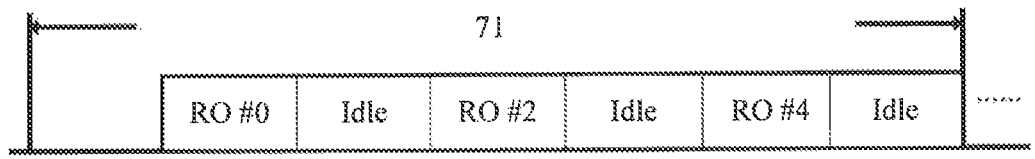
FIG. 8 is a schematic diagram of a valid RO.

FIG. 8 is a schematic diagram of a valid RO. As shown in the figure, in a possible implementation, the valid RO may be an odd- or even-numbered RO in a radio frame and/or slot 71 of a PRACH.

In a possible implementation, the information about the valid RO includes a start time of the valid RO. For example, if an RO #1 is a valid RO, the information about the valid RO includes a start time of the RO #1.

In a possible implementation, the valid RO may be indicated by using higher layer signaling, for example, a higher layer signaling prach-ConfigurationIndex indication. In another possible implementation, on the basis of the existing higher layer signaling, indication information may be added to indicate the valid RO in ROs indicated by prach-ConfigurationIndex, where the indication information may be higher layer signaling, a MAC-CE, downlink control information, or the like.

S152: Receive a PRACH signal transmitted by the UE.

The UE transmits the PRACH signal within the valid RO. Specifically, the UE transmits the PRACH signal only within the valid RO. In other words, the UE does not transmit a PRACH signal within the idle RO.

The network device receives the PRACH signal transmitted by the UE within the valid RO.

Therefore, according to the method for transmitting a physical random access channel signal provided in this embodiment of this disclosure, the information about the valid time period is indicated to the UE, where the information about the valid time period includes the information about the valid RO, and the valid time period is a part of the time domain resource of the physical random access channel (PRACH); and the PRACH signal transmitted by the UE is received. Some of ROs in the time domain resource of the PRACH can be used to transmit the PRACH signal, and some of the ROs in the time domain resource of the PRACH are reserved as idle ROs, so that the UE can use the idle ROs for CCA, to prevent a channel from being falsely determined to be busy, thereby ensuring a normal transmission of the PRACH signal.

Figure 9:
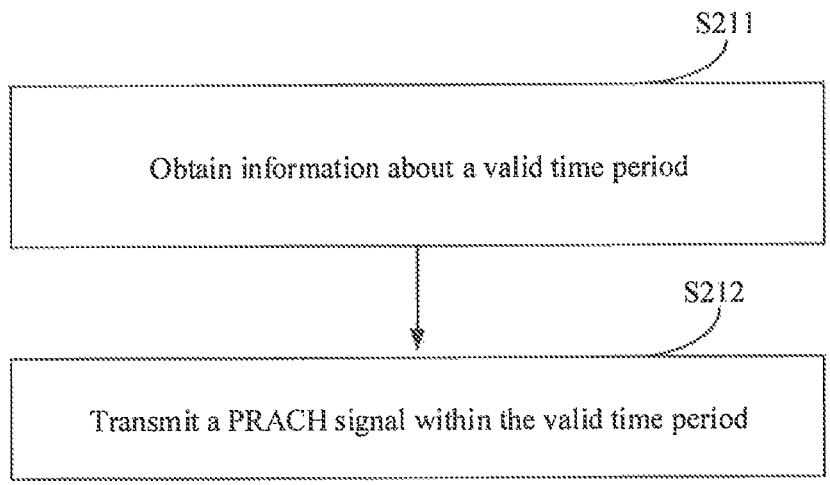
FIG. 9 is a schematic flowchart of a method for transmitting a physical random access channel signal according to an embodiment of this disclosure.

FIG. 9 is a schematic flowchart of a method for transmitting a physical random access channel signal according to an embodiment of this disclosure. The method may be performed by an electronic device, such as UE. In other words, the method may be performed by software or hardware installed on the UE. As shown in the figure, the method may include the following steps S211 and S212.

S211: Obtain information about a valid time period.

In a possible implementation, the UE may obtain the information about the valid time period based on preset information. For example, the Table 2 above may be stored in the UE as the preset information, from which the information about the valid time period is obtained in this step.

S212: Transmit a PRACH signal within the valid time period.

The UE transmits the PRACH signal within the valid time period. Specifically, the UE transmits the PRACH signal only within the valid time period. In other words, the UE does not transmit a PRACH signal within an idle time period.

A network device receives the PRACH signal transmitted by the UE within the valid time period.

Therefore, according to the method for transmitting a physical random access channel signal provided in this embodiment of this disclosure, the information about the valid time period is obtained, where the valid time period is a part of a time domain resource of a physical random access channel (PRACH); and the PRACH signal is transmitted within the valid time period. A part of the time domain resource of the PRACH can be used to transmit the PRACH signal, and a part of the time domain resource of the PRACH is reserved as an idle time period, so that the UE can use the idle time period for CCA, to prevent a channel from being falsely determined to be busy, thereby ensuring a normal transmission of the PRACH signal.

Figure 10:
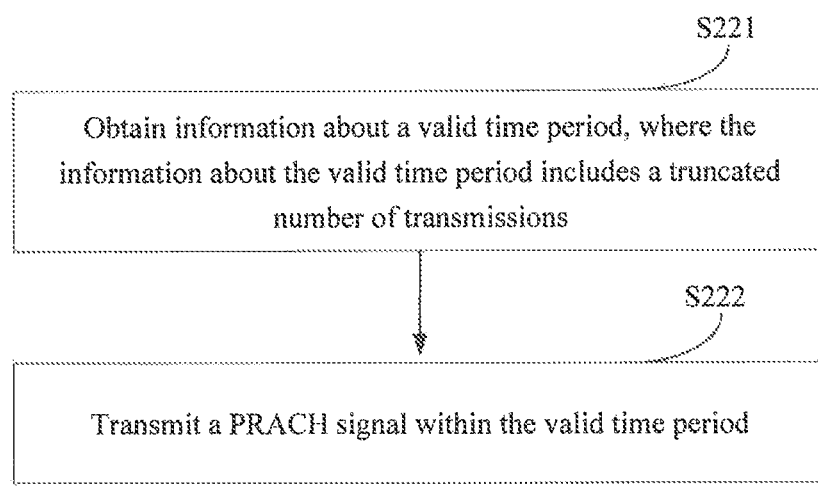
FIG. 10 is another schematic flowchart of a method for transmitting a physical random access channel signal according to an embodiment of this disclosure.

FIG. 10 is another schematic flowchart of a method for transmitting a physical random access channel signal according to an embodiment of this disclosure. The method may be performed by an electronic device, such as UE. In other words, the method may be performed by software or hardware installed on the UE. As shown in the figure, the method may include the following steps S221 and S222.

S221: Obtain information about a valid time period, where the information about the valid time period includes the truncated number of transmissions.

In a possible implementation, the UE may obtain the information about the valid time period based on preset information. For example, the Table 2 above may be stored in the UE as the preset information, from which the information about the valid time period is obtained in this step.

The information about the valid time period includes a truncated number of transmissions, where the truncated number of transmissions is the number of transmissions of a time domain sequence of a random access preamble within one random access occasion (RO), the truncated number of transmissions is greater than or equal to 1, and the valid time period is less than transmission duration of the one RO.

In a possible implementation, the truncated number of transmissions is less than an initial number of transmissions, where the initial number of transmissions is the number of transmissions of the time domain sequence of the preamble corresponding to a specified PRACH format within the one RO, and the initial number of transmissions is greater than 1.

In a possible implementation, the information about the valid time period further includes a start time of the valid time period.

In a possible implementation, the UE may determine the valid time period based on the truncated number of transmissions, and transmit a PRACH signal according to the valid time period in a subsequent step.

S222: Transmit the PRACH signal within the valid time period.

The UE transmits the PRACH signal within the valid time period. Specifically, the UE transmits the PRACH signal only within the valid time period. In other words, the UE does not transmit a PRACH signal within the idle time period.

A network device receives the PRACH signal transmitted by the UE within the valid time period.

Therefore, according to the method for transmitting a physical random access channel signal provided in this embodiment of this disclosure, a part of a time domain resource of a PRACH can be used to transmit the PRACH signal, and a part of the time domain resource of the PRACH is reserved as an idle time period, so that the UE can use the idle time period for CCA, to prevent a channel from being falsely determined to be busy, thereby ensuring a normal transmission of the PRACH signal.

Figure 11:
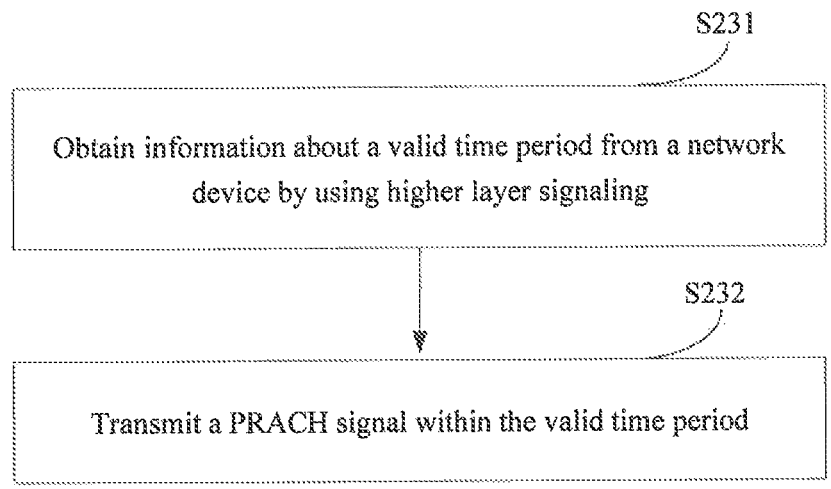
FIG. 11 is another schematic flowchart of a method for transmitting a physical random access channel signal according to an embodiment of this disclosure.

FIG. 11 is another schematic flowchart of a method for transmitting a physical random access channel signal according to an embodiment of this disclosure. The method may be performed by an electronic device, such as UE. In other words, the method may be performed by software or hardware installed on the UE. As shown in the figure, the method may include the following steps S231 and S232.

S231: Obtain information about an valid time period from a network device by using higher layer signaling.

In a possible implementation, the information about the valid time period is obtained from the network device, for example, by using the higher layer signaling prach-ConfigurationIndex.

The information about the valid time period includes a truncated number of transmissions, where the truncated number of transmissions is the number of transmissions of a time domain sequence of a random access preamble within one random access occasion (RO), the truncated number of transmissions is greater than or equal to 1, and the valid time period is less than transmission duration of the one RO.

In a possible implementation, the truncated number of transmissions is less than an initial number of transmissions, where the initial number of transmissions is the number of transmissions of the time domain sequence of the preamble corresponding to a specified PRACH format within the one RO, and the initial number of transmissions is greater than 1.

In a possible implementation, the information about the valid time period further includes a start time of the valid time period.

S232: Transmit a PRACH signal within the valid time period.

The UE transmits the PRACH signal within the valid time period. Specifically, the UE transmits the PRACH signal only within the valid time period. In other words, the UE does not transmit a PRACH signal within an idle time period.

The network device receives the PRACH signal transmitted by the UE within the valid time period.

Therefore, according to the method for transmitting a physical random access channel signal provided in this embodiment of this disclosure, a part of a time domain resource of a PRACH can be used to transmit the PRACH signal, and a part of the time domain resource of the PRACH is reserved as an idle time period, so that the UE can use the idle time period for CCA, to prevent a channel from being falsely determined to be busy, thereby ensuring a normal transmission of the PRACH signal.

Figure 12:
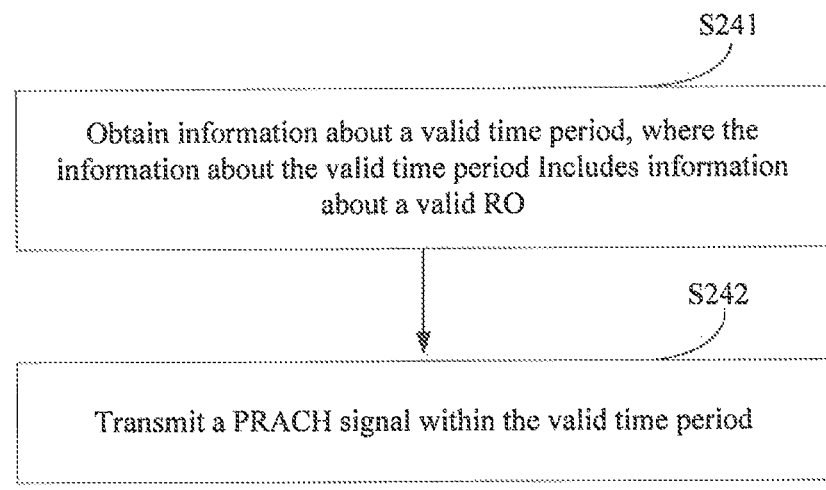
FIG. 12 is another schematic flowchart of a method for transmitting a physical random access channel signal according to an embodiment of this disclosure.

FIG. 12 is another schematic flowchart of a method for transmitting a physical random access channel signal according to an embodiment of this disclosure. The method may be performed by an electronic device, such as UE. In other words, the method may be performed by software or hardware installed on the UE. As shown in the figure, the method may include the following steps S241 and S242.

S241: Obtain information about a valid time period, where the information about the valid time period includes information about a valid RO.

The valid time period is a part of a time domain resource of a PRACH. The time domain resource of the PRACH includes a plurality of ROs, and the valid RO is a part of the plurality of ROs. The other part of the ROs different from the valid RO is an idle RO.

In a possible implementation, the valid RO may be an odd- or even-numbered RO.

In a possible implementation, the information about the valid RO includes a start time of the valid RO.

In a possible implementation, the valid RO may be indicated by using higher layer signaling, for example, a higher layer signaling prach-ConfigurationIndex indication. In another possible implementation, on the basis of the existing higher layer signaling, indication information may be added to indicate the valid RO in ROs indicated by prach-ConfigurationIndex, where the indication information may be higher layer signaling, a MAC-CE, downlink control information, or the like.

S242: Transmit a PRACH signal within the valid time period.

The UE transmits the PRACH signal within the valid time period. Specifically, the UE transmits the PRACH signal only within the valid time period. In other words, the UE does not transmit a PRACH signal within an idle time period.

The network device receives the PRACH signal transmitted by the UE within the valid time period.

Therefore, according to the method for transmitting a physical random access channel signal provided in this embodiment of this disclosure, some of ROs in the time domain resource of the PRACH can be used to transmit the PRACH signal, and some of the ROs in the time domain resource of the PRACH are reserved as idle ROs, so that the UE can use the idle ROs for CCA, to prevent a channel from being falsely determined to be busy, thereby ensuring a normal transmission of the PRACH signal.

Figure 13:
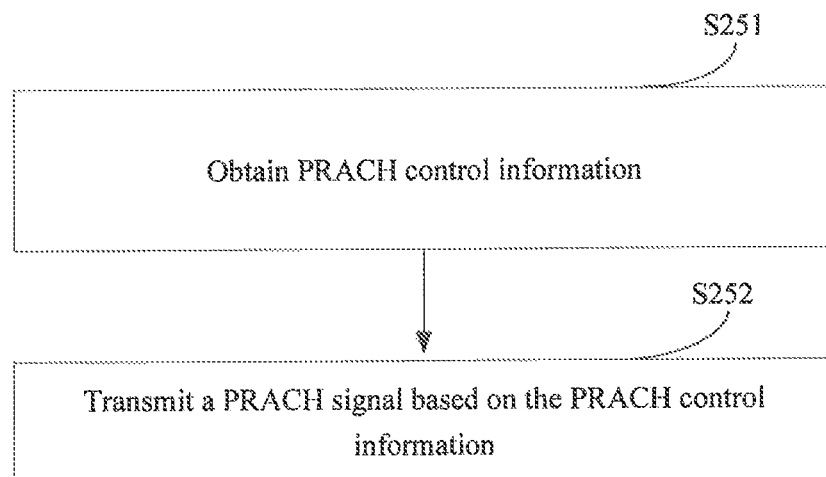
FIG. 13 is another schematic flowchart of a method for transmitting a physical random access channel signal according to an embodiment of this disclosure.

FIG. 13 is another schematic flowchart of a method for transmitting a physical random access channel signal according to an embodiment of this disclosure. The method may be performed by an electronic device, such as UE. In other words, the method may be performed by software or hardware installed on the UE. As shown in the figure, the method may include the following steps S251 and S252.

S251: Obtain PRACH control information.

The PRACH control information is used to limit a transmission time of the PRACH signal to be less than transmission duration of one RO.

The UE may obtain the PRACH control information from other external devices, such as a network device. The PRACH control information may indicate the UE to use a truncated transmission mode for transmission. The truncated transmission mode may be a predefined truncated transmission format, such as formats A1s, A2s, A3s, B1s, B2s, B3s, B4s, and C2s shown above in Table 2. In addition, the truncated transmission mode may alternatively be a predefined initial number of transmissions minus a predetermined number of times, for example, minus 1 or 2.

In a possible implementation, the PRACH control information is used to indicate a valid RO for transmitting the PRACH signal. The valid RO is a part of multiple ROs.

In a possible implementation, the PRACH control information may include: a truncated number of transmissions, where the truncated number of transmissions is the number of transmissions of a time domain sequence of a random access preamble within one random access occasion (RO), and the truncated number of transmissions is greater than or equal to 1.

In a possible implementation, the truncated number of transmissions is less than an initial number of transmissions, where the initial number of transmissions is the number of transmissions of the time domain sequence of the preamble corresponding to a specified PRACH format within the one RO, and the initial number of transmissions is greater than 1.

In a possible implementation, the PRACH control information further includes a start time of the valid time period. For example, a preset time T may be delayed from the start time of the RO.

In a possible implementation, the PRACH control information may include: information about the valid RO. The time domain resource of the PRACH includes a plurality of ROs, and the valid RO is a part of the plurality of ROs. The other part of the ROs different from the valid RO is an idle RO.

In a possible implementation, the valid RO may be an odd- or even-numbered RO.

In a possible implementation, the information about the valid RO includes a start time of the valid RO.

In a possible implementation, the valid RO may be indicated by using higher layer signaling, for example, a higher layer signaling prach-ConfigurationIndex indication. In another possible implementation, on the basis of the existing higher layer signaling, indication information may be added to indicate the valid RO in ROs indicated by prach-ConfigurationIndex, where the indication information may be higher layer signaling, a MAC-CE, downlink control information, or the like.

S252: Transmit a PRACH signal based on the PRACH control information.

The UE transmits the PRACH signal based on a control parameter in the PRACH control information. The network device receives the PRACH signal transmitted by the UE.

Therefore, according to the method for transmitting a physical random access channel signal provided in this embodiment of this disclosure, the idle time period can be properly reserved, so that the UE can use the idle time period for CCA, to prevent a channel from being falsely determined to be busy, thereby ensuring a normal transmission of the PRACH signal.

Figure 14:
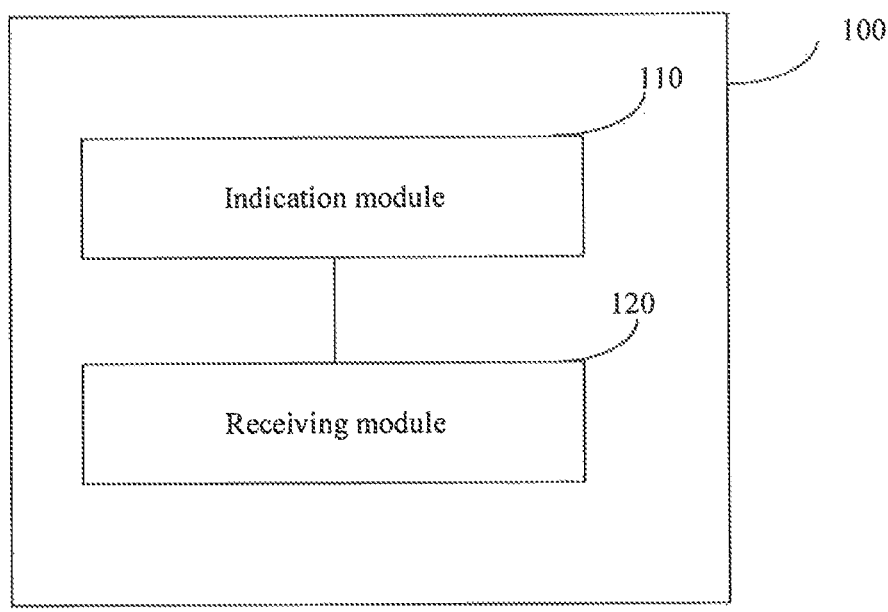
FIG. 14 is a schematic structural diagram of an apparatus for transmitting a physical random access channel signal according to an embodiment of this disclosure.

FIG. 14 is a schematic structural diagram of an apparatus for transmitting a physical random access channel signal according to an embodiment of this disclosure. The apparatus 100 includes an indication module 110 and a receiving module 120.

The indication module 110 is configured to indicate information about a valid time period to user equipment (UE), where the valid time period is a part of a time domain resource of a physical random access channel (PRACH); and the receiving module 120 is configured to receive a PRACH signal transmitted by the UE.

The apparatus 100 provided in this embodiment of this disclosure can perform the corresponding steps in the methods described in the foregoing method embodiments, and achieve the functions and beneficial effects of the methods described in the foregoing method embodiments. Details are not repeated herein.

Figure 15:
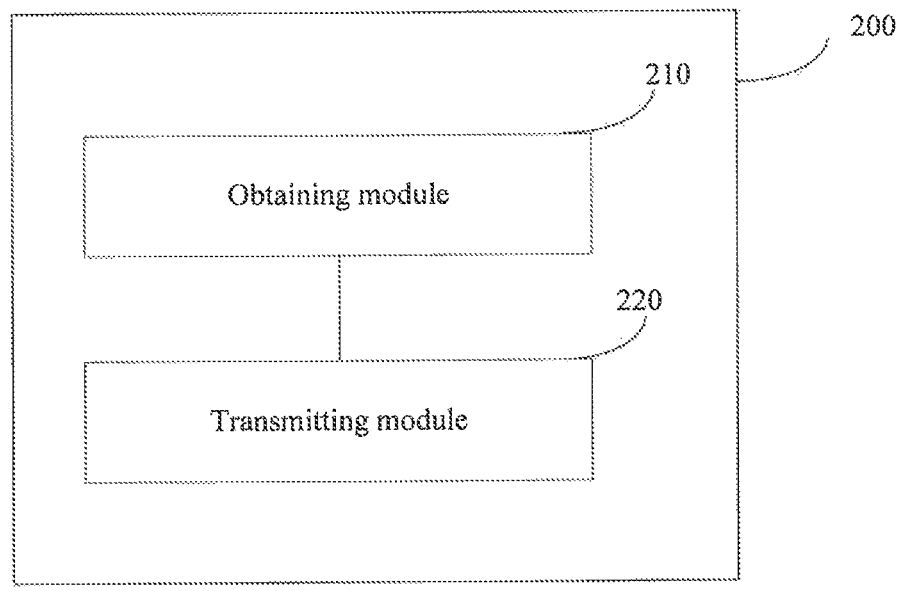
FIG. 15 is a schematic structural diagram of an apparatus for transmitting a physical random access channel signal according to an embodiment of this disclosure.

FIG. 15 is a schematic structural diagram of an apparatus for transmitting a physical random access channel signal according to an embodiment of this disclosure. The apparatus 200 includes an obtaining module 210 and a transmitting module 220.

The obtaining module 210 is configured to obtain information about a valid time period, where the valid time period is a part of a time domain resource of a physical random access channel (PRACH).

The transmitting module 220 is configured to transmit the PRACH signal within the valid time period.

The apparatus 200 provided in this embodiment of this disclosure can perform the corresponding steps in the methods described in the foregoing method embodiments, and achieve the functions and beneficial effects of the methods described in the foregoing method embodiments. Details are not repeated herein.

Figure 16:
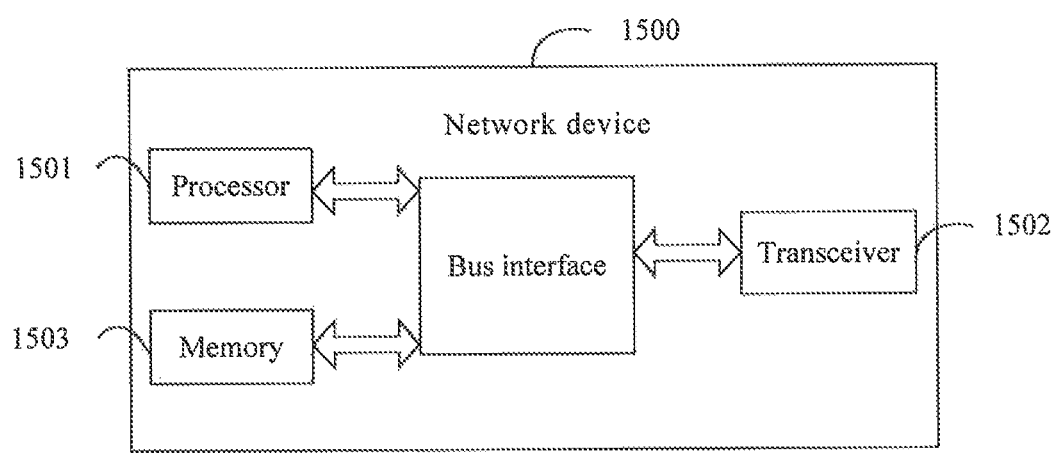
FIG. 16 is a schematic diagram of a hardware structure of an electronic device performing a method for transmitting a physical random access channel signal according to an embodiment of this disclosure.

FIG. 16 is a schematic diagram of a hardware structure of an electronic device performing a method for transmitting a physical random access channel signal according to an embodiment of this disclosure. The electronic device may be a network device. As shown in the figure, the network device 1500 includes a processor 1501, a transceiver 1502, a memory 1503, and a bus interface.

In this embodiment of this disclosure, the network device 1500 further includes a program stored on the memory 1503 and capable of running on the processor 1501, and when the program is executed by the processor 1501, the following steps are implemented: indicating information about a valid time period to user equipment (UE), where the valid time period is a part of a time domain resource of a physical random access channel (PRACH); and receiving a PRACH signal transmitted by the UE.

When the program is executed by the processor, the processes of the foregoing methods are implemented, with the same technical effects achieved. To avoid repetition, details are not repeated herein.

In the figure, a bus architecture may include any number of interconnected buses and bridges, which are specifically linked together by using various circuits of one or more processors represented by the processor 1501 and a memory represented by the memory 1503. The bus architecture may further link various other circuits such as peripheral devices, voltage regulators, and power management circuits, which are all known in the art, and therefore, no further description will be provided herein. The bus interface provides an interface. The transceiver 1502 may be a plurality of elements, that is, including a transmitter and a receiver, and provide a unit for communicating with various other apparatuses over a transmission medium.

The processor 1501 is responsible for managing the bus architecture and general processing, and the memory 1503 may store data used when the processor 1501 performs an operation.

An embodiment of this disclosure further proposes a computer-readable storage medium that stores one or more programs, and when the one or more programs are executed by a terminal including a plurality of application programs, the terminal is enabled to perform the following operations: indicating information about a valid time period to user equipment (UE), where the valid time period is a part of a time domain resource of a physical random access channel (PRACH); and receiving a PRACH signal transmitted by the UE.

The computer-readable storage medium includes a read-only memory (ROM), a random access memory (RAM), a magnetic disk, an optical disc, or the like.

When the program is executed by the processor, the processes of the foregoing methods are implemented, with the same technical effects achieved. To avoid repetition, details are not repeated herein.

Further, an embodiment of this disclosure further provides a program product, where the program product includes a program stored on a non-transitory computer-readable storage medium, and the program includes program instructions. When the program instructions are executed by a computer, the following procedures are implemented: indicating information about a valid time period to user equipment (UE), where the valid time period is a part of a time domain resource of a physical random access channel (PRACH); and receiving a PRACH signal transmitted by the UE.

When the program is executed by the processor, the processes of the foregoing methods are implemented, with the same technical effects achieved. To avoid repetition, details are not repeated herein.

Figure 17:
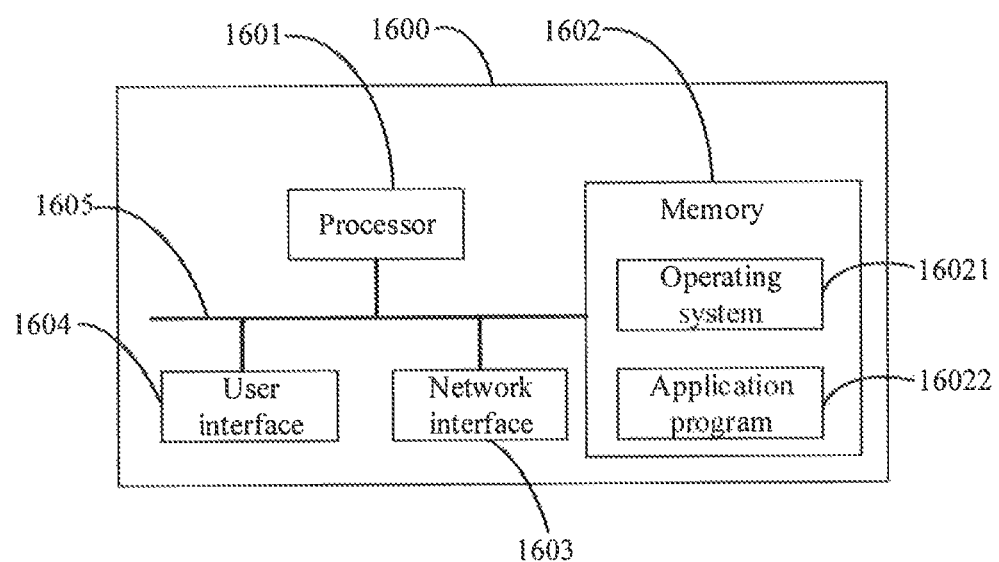
FIG. 17 is a schematic diagram of a hardware structure of an electronic device performing a method for transmitting a physical random access channel signal according to an embodiment of this disclosure.

FIG. 17 is a schematic diagram of a hardware structure of an electronic device performing a method for transmitting a physical random access channel signal according to an embodiment of this disclosure. The electronic device may be UE, such as a terminal device of a user. The terminal device 1600 shown in the figure includes at least one processor 1601, a memory 1602, a user interface 1604, and at least one network interface 1603. Various components in the terminal device 1600 are coupled together by using a bus system 1605. It can be understood that the bus system 1605 is configured to implement connection and communication between these components. In addition to a data bus, the bus system 1605 further includes a power bus, a control bus, and a status signal bus. However, for the sake of clarity, various buses are marked as the bus system 1605 in the figure.

The user interface 1603 may include a display, a keyboard, or a pointing device (for example, a mouse, a trackball, a touch panel, or a touchscreen).

It can be understood that the memory 1602 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. As an exemplary rather than restrictive description, many forms of RAMs may be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 1602 in the system and method described in the embodiments of this disclosure is intended to include but not limited to these and any other suitable types of memories.

In some embodiments, the memory 1602 stores the following elements, executable modules or data structures, or a subset thereof, or an extended set thereof: an operating system 16021 and an application program 16022.

The operating system 16021 includes various system programs, such as a framework layer, a core library layer, and a driver layer, for implementing various basic services and processing hardware-based tasks. The application program 16022 includes various application programs, such as a media player and a browser, for implementing various application services. A program for implementing the method of the embodiments of this disclosure may be included in the application program 16022.

In this embodiment of this disclosure, the terminal device 1600 further includes a program stored on the memory 1602 and capable of running on the processor 1601, and when the program is executed by the processor 1601, the following steps are implemented: obtaining information about a valid time period, where the valid time period is a part of a time domain resource of a physical random access channel (PRACH); and transmitting the PRACH signal within the valid time period.

When the program is executed by the processor, the processes of the foregoing methods are implemented, with the same technical effects achieved. To avoid repetition, details are not repeated herein.

The method disclosed in the foregoing embodiments of this disclosure may be applied to the processor 1601 or implemented by the processor 1601. The processor 1601 may be an integrated circuit chip having a signal processing capability. During implementation, the steps of the foregoing method can be completed by a hardware integrated logic circuit in the processor 1601 or instructions in the form of software. The foregoing processor 1601 may be a general-purpose processor, a digital signal processor (DSP), an application specific integrated circuit (ASIC), a field-programmable gate array (FPGA) or another programmable logic device, a discrete gate or transistor logic device, or a discrete hardware component. The methods, steps, and logical block diagrams disclosed in the embodiments of this disclosure can be implemented or executed. The general-purpose processor may be a microprocessor, or the processor may be any conventional processor or the like. The steps of the method disclosed with reference to the embodiments of this disclosure can be directly performed by a hardware decoding processor, or by a combination of hardware and software modules in a decoding processor. The software module may be located in a mature computer-readable storage medium in the art, such as a random access memory, a flash memory, a read-only memory, a programmable read-only memory, an electrically erasable programmable memory, or a register. The computer-readable storage medium is located in the memory 1602. The processor 1601 reads the information in the memory 1602, and completes the steps of the foregoing method in combination with hardware in the processor. Specifically, a program is stored on the computer-readable storage medium, and when the program is executed by the processor 1601, the following steps are implemented: obtaining information about a valid time period, where the valid time period is a part of a time domain resource of a physical random access channel (PRACH); and transmitting the PRACH signal within the valid time period.

It can be understood that these embodiments described in the embodiments of this disclosure can be implemented by hardware, software, firmware, middleware, microcode, or a combination thereof. For implementation by hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of this disclosure, or a combination thereof.

For implementation by software, technologies described in the embodiments of this disclosure may be implemented by executing functional modules (for example, a process and a function) in the embodiments of this disclosure. Software code may be stored in the memory and executed by the processor. The memory can be implemented inside or outside the processor.

An embodiment of this disclosure further proposes a computer-readable storage medium that stores one or more programs, and when the one or more programs are executed by a terminal including a plurality of application programs, the terminal is enabled to perform the following operations: obtaining information about a valid time period, where the valid time period is a part of a time domain resource of a physical random access channel (PRACH); and transmitting the PRACH signal within the valid time period.

The computer-readable storage medium includes a read-only memory (ROM), a random access memory (RAM), a magnetic disk, an optical disc, or the like.

When the program is executed by the processor, the processes of the foregoing methods are implemented, with the same technical effects achieved. To avoid repetition, details are not repeated herein.

Further, an embodiment of this disclosure further provides a program product, where the program product includes a program stored on a non-transitory computer-readable storage medium, and the program includes program instructions. When the program instructions are executed by a computer, the following procedures are implemented: obtaining information about a valid time period, where the valid time period is a part of a time domain resource of a physical random access channel (PRACH); and transmitting the PRACH signal within the valid time period.

When the program is executed by the processor, the processes of the foregoing methods are implemented, with the same technical effects achieved. To avoid repetition, details are not repeated herein.

Persons skilled in the art should understand that the embodiments of this disclosure may be provided as a method, a system, or a program product. Therefore, this disclosure may use a form of hardware only embodiments, software only embodiments, or embodiments with a combination of software and hardware. Moreover, this disclosure may take the form of a program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the program product according to the embodiments of this disclosure. It should be understood that each process and/or block in the flowchart and/or block diagram, and a combination of processes and/or blocks in the flowchart and/or block diagram can be implemented by program instructions. These program instructions may be provided for a processor of a general-purpose computer, a dedicated computer, an embedded processor, or another programmable data processing device to generate a machine, so that the instructions executed by the processor of the computer or the another programmable data processing device produce an apparatus for implementing functions specified in one or more flows in the flowchart and/or one or more blocks in the block diagram.

These program instructions may also be stored in a computer-readable memory that can guide a computer or another programmable data processing device to work in a specific manner, so that the instructions stored in the computer-readable memory produce an article of manufacture including an instruction apparatus, and the instruction apparatus implements functions specified in one or more flows in the flowchart and/or one or more blocks in the block diagram.

These program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function specified in one or more processes in the flowcharts and/or in one or more blocks in the block diagrams.

In a typical configuration, a computing device includes one or more processors (CPUs), an input/output interface, a network interface, and a memory.

The memory may include a non-permanent memory, a random access memory (RAM) and/or a non-volatile memory, such as a read-only memory (ROM) or a flash memory (flash RAM), in computer-readable media. The memory is an example of a computer-readable medium.

A computer-readable medium includes permanent and non-permanent, removable and non-removable media and may implement information storage by using any method or technology. The information may be computer-readable instructions, data structures, program modules, or other data. Examples of computer storage media include, but are not limited to, a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape magnetic disk storage or another magnetic storage device or any other non-transmission media, which can be used to store information that can be accessed by the computing device. According to the definitions in this specification, the computer-readable medium does not include transitory computer-readable media (transitory media), such as modulated data signals and carriers.

It should be further noted that, the terms "include", "comprise", or any of their variants are intended to cover a non-exclusive inclusion, so that a process, a method, a commodity, or a device that includes a series of elements not only includes those elements but also includes other elements that are not expressly listed, or further includes elements inherent to such a process, method, commodity, or device. Without being subject to further limitations, an element defined by a phrase "including a/an . . . " does not exclude presence of other identical elements in the process, method, commodity, or device that includes the very element.

Persons skilled in the art should understand that the embodiments of this disclosure may be provided as a method, a system, or a program product. Therefore, this disclosure may use a form of hardware only embodiments, software only embodiments, or embodiments with a combination of software and hardware. Moreover, this disclosure may take the form of a program product that is implemented on one or more computer-usable storage media (including but not limited to a disk memory, a CD-ROM, an optical memory, and the like) that include computer-usable program code.

The foregoing description is the embodiments of this disclosure and is not intended to limit this disclosure. Various changes and modifications may be made to this disclosure for persons skilled in the art. Any modifications, equivalent replacements, improvements, or the like made within the principle of this disclosure shall fall within the protection scope of this disclosure.

The invention claimed is:

1. A method for transmitting a physical random access channel signal, comprising:
obtaining, by user equipment, information about a valid time period, wherein the valid time period is a part of a time domain resource of a physical random access channel (PRACH); and
transmitting, by the user equipment, a PRACH signal within the valid time period;
wherein the information about the valid time period comprises:
a truncated number of transmissions, wherein the truncated number of transmissions is the number of transmissions of a time domain sequence of a random access preamble within one random access occasion (RO), the truncated number of transmissions is greater than or equal to 1, and the valid time period is less than transmission duration of the one RO;
wherein the truncated number of transmissions is less than an initial number of transmissions, wherein the initial number of transmissions is the number of transmissions of the time domain sequence of the preamble corresponding to a specified PRACH format within the one RO, and the initial number of transmission is greater than 1.

2. The method according to claim 1, wherein the obtaining information about a valid time period comprises:
obtaining the information about the valid time period from a network device by using higher layer signaling.

3. The method according to claim 1, wherein the information about the valid time period further comprises: a start time of the valid time period.

4. The method according to claim 1, wherein the information about the valid time period comprises: information about a valid RO.

5. The method according to claim 4, wherein the valid RO is an odd- or even-numbered RO.

6. The method according to claim 4, wherein the information about the valid RO comprises: a start time of the valid RO.

7. An electronic device, comprising:
a processor; and
a memory configured to store computer executable instructions, wherein when executing the executable instructions, the processor is configured to:
indicate information about a valid time period to user equipment (LT), wherein the valid time period is a part of a time domain resource of a physical random access channel (PRACH); and
receive a PRACH signal transmitted by the UE;
wherein the information about the valid time period comprises;
a truncated number of transmissions, wherein the truncated number of transmissions is the number of transmissions of a time domain sequence of a random access preamble within one random access occasion (RO), the truncated number of transmissions is greater than or equal to 1, and the valid time period is less than transmission duration of the one RO;
wherein the truncated number of transmission is less than an initial number of transmissions, wherein the initial number of transmissions is the number of transmissions of the time domain sequence of the preamble corresponding to a specified PRACH format within the one RO, and the initial number of transmissions is greater than 1.

8. The electronic device according to claim 7, wherein the information about the valid time period further comprises: a start time of the valid time period.

9. The electronic device according to claim 7, wherein the indicating information about a valid time period to user equipment (UE) comprises:
indicating the information about the valid time period to the UE by using higher layer signaling.

10. The electronic device according to claim 7, wherein the information about the valid time period comprises:
information about a valid RO.

11. The electronic device according to claim 10, wherein the valid RO is an odd- or even-numbered RO.

12. The electronic device according to claim 10, wherein the information about the valid RO comprises: a start time of the valid RO.

13. An electronic device, comprising:
a processor; and
a memory configured to store computer executable instructions, wherein when executing the executable instructions, the processor is configured to:
obtain information about a valid time period, wherein the valid time period is a part of a time domain resource of a physical random access channel (PRACH); and
transmit a MACH signal within the valid time period;

wherein the information about the valid time period comprises:

a truncated number of transmissions, wherein the truncated number of transmissions is the number of transmissions of a time domain sequence of a random access preamble within one random access occasion (RO), the truncated number of transmissions is greater than or equal to 1, and the valid time period is less than transmission duration of the one RO;

wherein the truncated number of transmission is less than an initial number of transmissions, wherein the initial number of transmissions is the number of transmissions of the time domain sequence of the preamble corresponding to a specified PRACH format within the one RO, and the initial number of transmissions is greater than 1.

14. The electronic device according to claim 13, wherein the information about the valid time period comprises: information about a valid RO.

15. The electronic device according to claim 13, wherein the processor is further configured to:
obtain the information about the valid time period from a network device by using higher layer signaling.

16. The electronic device according to claim 13, wherein the information about the valid time period further comprises: a start time of the valid time period.

17. The electronic device according to claim 14, wherein the valid RO is an odd- or even-numbered RO.

18. The electronic device according to claim 14, wherein the information about the valid RO comprises: a start time of the valid RO.

* * * * *